US007446312B2

(12) United States Patent
Räther

(10) Patent No.: US 7,446,312 B2
(45) Date of Patent: Nov. 4, 2008

(54) GENERATION OF MULTIPLY CHARGED IONS FOR TANDEM MASS SPECTROMETRY

(75) Inventor: Oliver Räther, Bremen (DE)

(73) Assignee: Bruker Daltonik, GmbH, Bremen (DE)

( * ) Notice: Subject to any disclaimer, the term of this patent is extended or adjusted under 35 U.S.C. 154(b) by 251 days.

(21) Appl. No.: 11/509,828

(22) Filed: Aug. 24, 2006

(65) Prior Publication Data

US 2007/0051886 A1 Mar. 8, 2007

(30) Foreign Application Priority Data

Sep. 2, 2005 (DE) ....................... 10 2005 041 655

(51) Int. Cl.
*B01D 59/44* (2006.01)

(52) U.S. Cl. ......................... 250/288; 250/281; 250/282

(58) Field of Classification Search ................. 250/288, 250/281, 282
See application file for complete search history.

(56) References Cited

U.S. PATENT DOCUMENTS 6,989,528 B2 * 1/2006 Schultz et al. .............. 250/281
2008/0044915 A1 * 2/2008 Hunt et al. .................... 436/89

FOREIGN PATENT DOCUMENTS

| | | | |
|---|---|---|---|
| EP | 1 220 284 | A2 | 7/2002 |
| GB | 2299445 | A | 10/1996 |
| GB | 2 362 259 | A | 11/2001 |
| GB | 2 406 703 | A | 4/2005 |
| GB | 2410370 | A | 7/2005 |
| WO | WO 2004/109274 | A1 | 12/2004 |

OTHER PUBLICATIONS

He, et al., "Increasing the Negative Charge of a Macroanion in the Gas Phas via Sequential Charge Inversion Reactions", Analytical Chemistry, Jul. 15, 2004, pp. 4189-4192, vol. 76, No. 14, American Chemical Society.

* cited by examiner

*Primary Examiner*—Kiet T Nguyen
(74) *Attorney, Agent, or Firm*—Law Offices of Paul E. Kudirka

(57) ABSTRACT

Multiply-charged ions are generated from singly-charged ions of analyte substances. The singly-charged ions, which are supplied by many types of ion sources, are accelerated, together with donor ions of substances which have only a very low proton affinity, into a reaction cell. In the reaction cell, protons are transferred from the donor ions to the analyte ions to protonate the analyte ions and increase the ion charge. The multiply-charged analyte ions are subsequently fragmented by a variety of techniques and mass analyzed.

20 Claims, 2 Drawing Sheets

GENERATION OF MULTIPLY CHARGED IONS FOR TANDEM MASS SPECTROMETRY

FIELD OF THE INVENTION

The invention relates to the generation of multiply charged ions from singly charged ions of analyte substances, particularly of biopolymers. The multiply charged ions enable fragmentation methods to be used which are especially suitable for structural analyses with tandem mass spectrometry.

BACKGROUND OF THE INVENTION

Over the past four decades, tandem mass spectrometry has developed into an extraordinarily successful branch of mass spectrometry. A tandem mass spectrometer (MS/MS for short) first filters out a pre-selected ion species from a supply of an ion mixture, usually in the form of a continuous ion beam, fragments this ion species, and measures the spectrum of the fragment ions in a mass analyzer. The ions of the ion species selected are frequently called “parent ions”; the fragment ions are frequently called “daughter ions”.

The importance of tandem mass spectrometry lies in the fact that the acquisition of the fragment ion spectra provides insights into the structure of the parent ions selected, on the one hand and, on the other, enables certain identification of the type of the parent ions. In the biological sciences, it particularly enables sequences in biopolymers (or at least parts of these sequences and also modifications of these sequences) to be determined. It particularly makes it possible to determine amino acid sequences in proteins and peptides.

The importance of tandem mass spectrometry has further increased because the two ionization methods used almost exclusively for biomolecules, namely electrospray ionization (ESI) and matrix-assisted laser desorption and ionization (MALDI), are extraordinarily gentle (so-called “soft” ionization methods) and supply practically no fragment ions themselves, as was the case with the early ionization methods such as electron impact ionization. The soft ionization methods supply only so-called pseudo-molecular ions, usually protonated or deprotonated molecules, which only provide information about the mass of the molecule, but no further information concerning the identity and structure of the molecules. Further information is therefore required for structural analyses, even for certain identification of a substance, as is practically only provided by tandem mass spectrometry. Even if the aim is “only” a quantitative determination of a substance being sought which is actually known, certain identification, and therefore the use of tandem mass spectrometry, is indispensable in bio-analysis. The biological sciences therefore use tandem mass spectrometers in the majority of analyses.

For the information about the structures of the analyte substances obtained from their fragment ions with the aid of tandem mass spectrometry, it is favorable if the analyte ions to be fragmented are available in a doubly or multiply charged form. Some types of fragmentation can only be undertaken on multiply charged ions anyway. Electrospray ionization (ESI) in itself generates not only singly charged ions but also significant quantities of multiply charged ions; and it is noticeable that electrospray ionization therefore is gaining ground compared to other ionization methods. However, since electrospray ionization always requires a liquid phase, and since sample introduction via liquid phases is always quite slow, and also has a few other disadvantages, the increasing restriction of bio-analytical mass spectrometry to electrospray ionization is not entirely favorable. The often cited possibility of coupling with liquid chromatography or capillary electrophoresis makes the overall analysis slow, and there is only limited time to analyze the sample just supplied by a chromatographic peak.

The other important type of ionization for biomolecules is ionization by matrix-assisted laser desorption (MALDI). This ionizes the samples from the solid phase. Hundreds of samples can be applied on a sample support. Pipetting robots are available for this. The transport of the samples on the sample support into the laser focus takes only fractions of seconds, as much time as is ever needed is available for the analysis of this sample (until the sample is completely used up). MALDI is ideal for the identification of tryptically digested proteins which have been separated by 2D gel electrophoresis. MALDI analysis of peptides which have been separated by liquid chromatography is gaining ground (HPLC MALDI). A disadvantage of MALDI, however, is that it only ever supplies singly charged ions of the analyte substances.

The current methods for analyzing MALDI ions in time-of-flight mass spectrometers (MALDI TOF and MALDI TOF/TOF) have disadvantages, mainly in terms of an inadequate mass accuracy. The mass accuracy is still unsatisfactory even if each mass spectrum is subjected to a time-consuming mathematical recalibration using co-measured calibration substances. This inadequate mass accuracy stems from the fact that the MALDI process gives the ions an initial energy which differs from spectrum acquisition to spectrum acquisition and which, in a time-of-flight mass spectrometer operated with axial injection, leads to continuous shifts in the ion signals on the mass scale. This instability of the mass scaling is not known in other types of mass spectrometer, including time-of-flight mass spectrometers with orthogonal ion injection in particular.

We have already indicated that for tandem mass spectrometry, which is generally based on mass spectrometers with a stable mass scale, the fragmentation of the selected ions is a very important step. Over the past few years, it has been realized that a fragmentation which is rich in structural information very preferably starts with multiply charged ions; at least with doubly charged ions. This already applies for the oldest type of fragmentation, collisionally induced fragmentation (CID); newer types of fragmentation which are based on the transfer of electrons can only be initiated on ions which are at least doubly charged in any case. For tandem mass spectrometry with ion sources that supply only singly charged ions, a fundamental question is therefore how to produce ions which are at least doubly charged from the singly charged ions.

Until now, the electrospraying of dissolved bio-substances and the desorption of such substances by the impact of highly charged droplets (or clusters) have been the only ionization methods which lead to multiply charged bio-analyte ions. It seems as if there has to be a vaporization of the solvent from a highly charged droplet of the analyte solution in order to obtain multiply charged ions of the analyte substances. Other ionization methods, including the very interesting matrix-assisted laser desorption and ionization (MALDI), and also chemical ionization (CI) or photoionization (PI), lead only to singly charged ions.

For proteins and peptides it has now turned out that there are essentially two fundamentally different types of fragmentation of these biopolymers. These two types of fragmentation provide sets of information which are independent of each other (often termed “orthogonal” methods), and a comparison of the fragment ion spectra of the two types of fragmentation provides particularly valuable additional information. A tandem mass spectrometer which allows both types of fragmentation to be used on the same analyte ions is therefore particularly valuable.

The first type of fragmentation is a decomposition of the parent ions after they have collected sufficient internal energy from one or several energy absorption processes. The energy can be collected from a large number of moderate collisions (CID=collision induced decomposition), and also by absorbing a large number of infrared quanta (IRMPD=infrared multi photon decomposition). The internal energy here is distributed over all the internal oscillation systems of the parent ions, but the localization of the energy changes constantly because the oscillation systems are coupled and therefore continuously exchange energy among themselves. If, at a bond of the parent ion, a force finally occurs which exceeds the bonding force, then the parent ion breaks here into two fragments. Statistically, the cleavages only affect those bonds with low binding energies. In the case of proteins, this type of decomposition mainly leads to so-called b and y fragment ions. These b and y fragment ions are dissociated exactly at the peptide C—N bond locations connecting the amino group NH with the acid group COOH. For this first type of fragmentation it is therefore favorable to start with doubly charged ions because singly charged ions are difficult to fragment and form only very few types of fragment ions when they do fragment. The fragmentation of peptide ions here does not create any long signal sequences which mirror relatively long sections of the amino acid sequences. The fragment ion spectra therefore contain relatively little information if the starting point is singly charged ions.

One modification of this is the so-called high energy collisionally induced fragmentation (HE-CID). With collisions of kinetic energies in the region of a few kiloelectron-volts, a single collision is sufficient to lead to fragmentations. While it is possible here to start with singly charged ions, the fragment spectra generated in this way look more complicated than low energy CID fragment ion spectra because they contain more spontaneous fragmentations, for example the splitting off of side chains, and also more subsequent fragmentations (double and triple fragmentations with the appearance of so-called internal fragments) and therefore more fragment ion signals overall. While it is true that these fragment ion spectra have a high informational value thanks to the high energy collisions, they are difficult to interpret and tend therefore to be avoided. Basically, these high energy fragment ion spectra of proteins also contain predominantly b and y fragment ions.

The second, fundamentally different type of fragmentation is brought about by an electron transfer to multiply positively charged parent ions, thus neutralizing a proton; the decomposition is spontaneous and leads predominantly to so-called c and z fragment ions, broken at C—C bonds inside the amino acids, the c fragment ions generally being in the majority. This fragmentation process never splits off side chains like phosphorylations or even glycosilations. They provide fragment ions which are very easy to interpret and which are particularly suitable for the sequencing of unknown peptides and proteins ("de novo sequencing"), and for recognition and localization of modifications. This second type of fragmentation requires of necessity multiply charged ions, at least doubly charged ions, so that, after neutralization of a proton, a protonated ion still remains. The electron transfer can be brought about by direct capture of an electron (ECD=electron capture dissociation), by transfer of an electron of a negatively charged ion (ETD=electron transfer dissociation), or by the transfer of an electron from a highly excited atom to the parent ion (MAID=metastable atom induced dissociation).

It is particularly favorable to be able to apply both types of fragmentation to the same analyte ions since the comparison of the fragmentation spectra at constant mass differences makes it possible to immediately recognize which of the ion signals belong to b and c fragments, and which to y and z fragments. This makes the sequence very easy to unambiguously read off, which cannot be said for a single fragment ion spectrum from the mixing of two species of fragment ions.

The production of multiply negatively charged analyte ions from singly deprotonated analyte ions has already been described ("Increasing the Negative Charge of a Macroanion in the Gas Phase via Sequential Charge Reversion Reactions", M. He and S. A. McLucky, Anal. Chem. 2004, 76, 4189-4192). The production here occurs in two stages, in which negative and positive ions with different proton affinities react with each other each time. This can only be undertaken in reaction cells which enable both negative and positive ions to be stored, for example in three-dimensional ion traps with ring and end cap electrodes. An analogous production of multiply positively charged ions has not yet been reported. The two-stage methods are also not particularly favorable for use in tandem mass spectrometers, however.

Whenever the term "mass of the ions" or simply "mass" is used here in connection with ions, it is always the "charge-related mass" m/z which is meant, i.e., the physical mass m of the ions divided by the dimensionless and absolute number z of the positive or negative elementary charges which this ion carries.

An "analysis" of an ion species or a substance is to be taken here as being both the determination of the quantity relative to other ion species or other substances ("quantitative analysis"), as well as the determination of the identity of the ion species or substance ("qualitative analysis") via further measurements, for example from measurements of the internal structure of the ions, or even only the determination of the structure; in the case of biopolymers, the sequence of the modified or unmodified polymer building blocks of the ions of an ion species in general ("structural analysis", "sequential analysis", "modification analysis" etc.).

SUMMARY OF THE INVENTION

In the method according to the invention, singly protonated analyte ions and protonated donor ions are accelerated into a reaction region, the analyte ions thereby being doubly and even multiply protonated with a large yield. The donor ions are ions of substances which have only low proton affinity and easily give up protons. Substances from the group of phosphazenes are favorable for the generation of donor ions, for example. This reaction is surprising since, according to the existing school of thought, the positively charged ions repel each other as a result of Coulomb forces and can hardly ever (except in very dense, hot plasmas, in which the analyte substances would decompose, however) come so close that a proton exchange reaction could take place. As yet, it has only been possible to speculate about the mechanism. It could be a tunnel effect of the protons over large distances through the Coulomb potential barrier.

It is important for the reaction that the two types of ion (or at least one ion type) are injected into the reaction region under acceleration. It is favorable here if the reaction region takes the form of a closed reaction cell. Favorable, but not absolutely necessary, is a reaction cell in the form of an RF multipole rod system, both ends of which have systems of apertured diaphragms at both ends whose potentials reflect most of the ions back into the reaction cell. The analyte ions and the donor ions are injected into the reaction cell with a potential difference of at least ten volts, or better still with around 30 to 50 volts. It is probable (but by no means certain) that the proton transfer occurs when the analyte ions and the donor ions meet in flight, either in a head-on collision or at least as they fly past each other in close proximity. The high yield here is surprising. If roughly the same quantities of analyte ions and donor ions are injected, then (at least for the analyte ions analyzed until now) the number of protonated analyte ions generated greatly exceeds twice the number of singly protonated analyte ions which remain behind. In general, no multiply charged analyte ions are formed if no donor ions are injected; under certain conditions, however, reactions seem also to occur in which doubly protonated ions are created by transfer of a proton from one ion to another ion of the same type (auto-ionization).

The analyte ions and the donor ions here can pass through the same acceleration region and can be injected simultaneously though the apertured diaphragm system at the entrance end. It is therefore favorable to mix analyte ions and donor ions and to inject them into the reaction cell together. Filling the reaction cell with a damping gas in the pressure range between $10^{-2}$ and 10 Pascal, preferentially in the Range between $10^{-2}$ and $10^{-1}$ Pascal, damps the ions formed after a few milliseconds in such a way that they collect in the axis and can be drawn out by an electric extraction field which acts only very close to the axis in the apertured diaphragm region at the exit end. It is thus possible to operate the reaction cell continuously, i.e., in a mode which continuously supplies multiply charged analyte ions. The reaction cell can also be operated discontinuously, however. It is not yet known if the damping gas is necessary for the proton transfer reactions.

The tandem mass spectrometer which makes use of the method according to the invention for the production of multiply charged analyte ions, comprises at least an ion source for the analyte ions, an ion source for the donor ions, an acceleration region for the analyte ions and one for the donor ions, although a single acceleration region can also be used jointly for both ion species, a reaction cell for the generation of the multiply charged analyte ions, a selection device to select the multiply protonated analyte ions for the fragmentation, a fragmentation device for the analyte ions selected, and a mass analyzer to acquire the mass spectrum of the fragment ions.

In principle, any ion source for the ionization of analyte substances can be used as the ion source for the analyte ions; in particular, however, the ion sources which are possible here are those which are generally favorable but which can only generate singly protonated analyte ions, such as chemical ionization (CI) or ionization by matrix-assisted laser desorption and ionization (MALDI). The CI or MALDI ion sources can be located inside or outside the vacuum system of the mass spectrometer. Similarly, any type of ion source can be used as the ion source for the donor ions, the favorable types here being electrospray ionization (ESI) and chemical ionization. These ion sources can also be located inside or outside the vacuum system.

As is the case with conventional tandem mass spectrometers, the selection device here can be a quadrupole mass filter which allows only a single ion species to pass and destroys all other ion species. It is favorable here if the reaction cell is in continuous operation. It is also possible, however, to use an ion gate which exports one selected ion species and leaves the other ions undamaged in front of the ion gate for subsequent analyses, these ions being stored temporarily in a suitably formed cell. A method such as this produces a discontinuous operation of the reaction cell.

Since the analyte ions are now available in a multiply charged form, all known types of fragmentation can be used for the fragmentation.

It is possible, in principle, to use almost any type of mass spectrometer as the mass analyzer. However, a particularly favorable type here is a time-of-flight mass spectrometer with orthogonal ion injection since it provides a fast spectrum acquisition, a high mass accuracy, a high mass range, a good utilization of the ions ("duty cycle") and a high dynamic range of measurement with comparatively low production costs.

BRIEF DESCRIPTION OF THE DRAWINGS

The above and further advantages of the invention may be better understood by referring to the following description in conjunction with the accompanying drawings in which.

DETAILED DESCRIPTION

Figure 1:
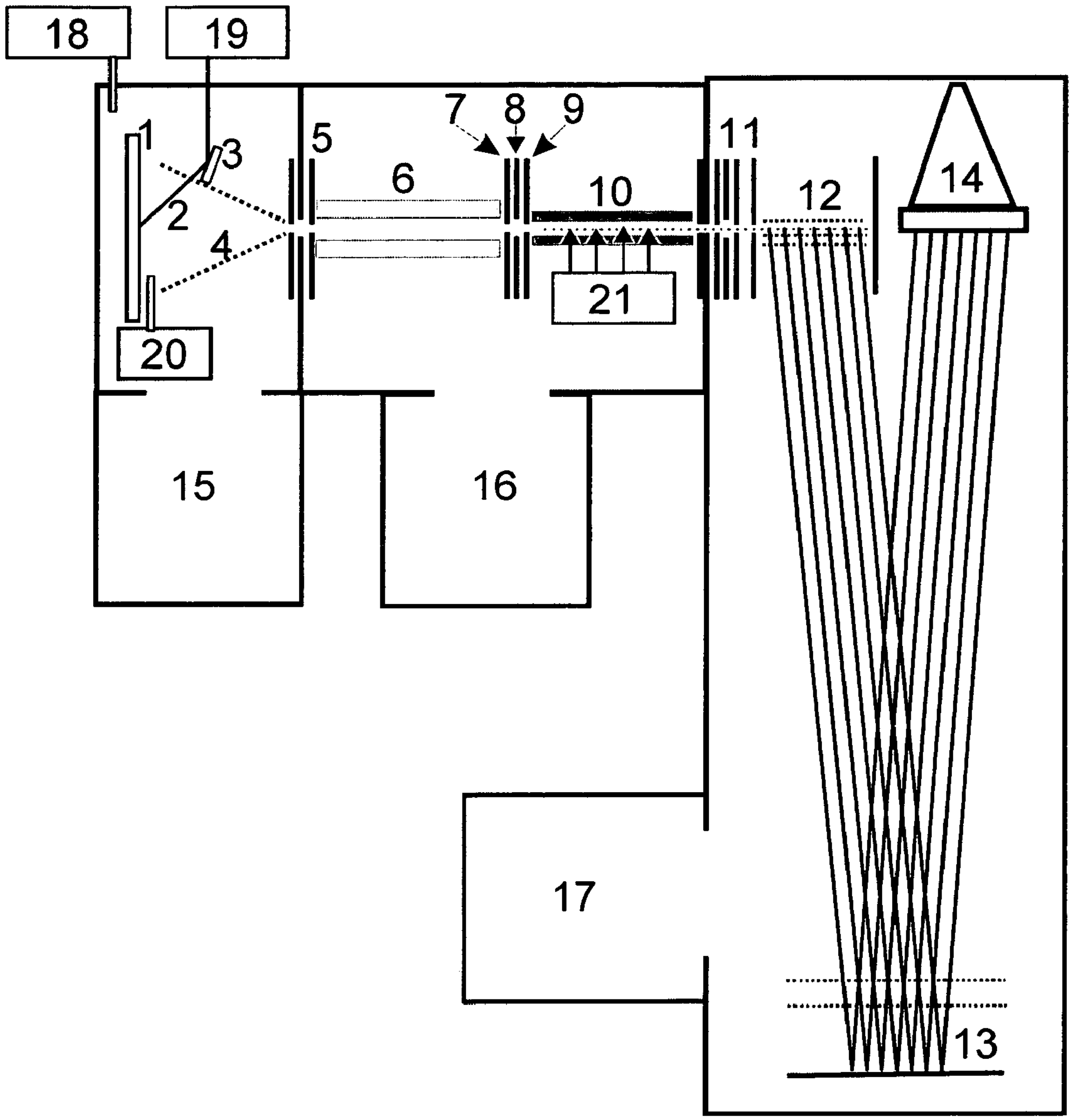
FIG. 1 illustrates a simple schematic array of a tandem mass spectrometer according to this invention. The centerpiece is the reaction cell (6) with quadrupole pole rod system and the two apertured diaphragm systems (5) at the entrance and (7, 8, 9) at the exit of the reaction cell (6). In the entrance section of the tandem mass spectrometer there is a MALDI sample support plate (1), a UV pulsed laser (19), which can send a beam of light (2) onto a sample on the sample support plate (1) via a mirror (3), and an ion funnel (4). The donor ions are generated in the CI ion source (20) and also enter into the ion funnel (4). Both ion species are accelerated by the potential drop in the apertured diaphragm system (5). The end of the reaction cell (6) and the apertured diaphragm system (7, 8, 9) form the ion gate; the first apertured diaphragm (7) can be slit for the excitation of the ion species selected for export (not visible in the schematic representation). Both collisionally induced fragmentation and a fragmentation by means of electron transfer from highly excited neutral atoms from the FAB neutral particle source (21) can be undertaken in the fragmentation chamber (10). The time-of-flight mass analyzer, comprising lens system (11) for the formation of a fine ion beam, pulser (12), reflector (13) and ion detector (14) measures the fragment ion spectra. A nitrogen generator (18) provides the ultra-pure nitrogen for the damping in the various chambers of the tandem mass spectrometer. The pump system with the pumps (15), (16) and (17) generates the various vacua in the chambers.
Figure 2:
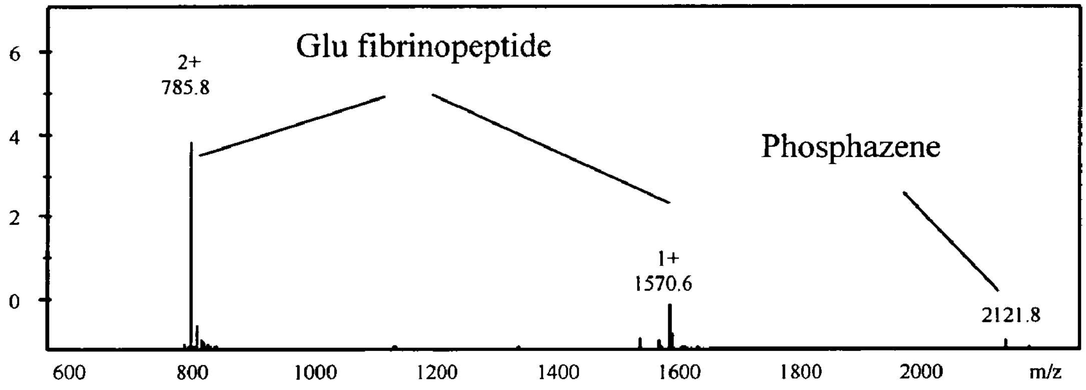
FIG. 2 represents an example of a mass spectrum of the ions which was obtained after injecting singly charged ions of glu fibrinopeptide together with donor ions (fluorinated phosphazene) with 40 volts acceleration into the reaction cell. An excess of doubly charged ions of the glu fibrinopeptide was formed.

A favorable embodiment of the method uses a reaction cell (6) which is formed by a multipole RF field between pole rods to confine the ions. At both ends of the pole rod system, systems of apertured diaphragms (5) and (7, 8, 9) are mounted whose potential distribution predominantly reflects the positively charged ions toward the interior of the reaction cell, even if they have higher speeds as a result of the acceleration on injection. Only those ions which are very close to the axis can leave the reaction cell (6) through the apertured diaphragm system (7, 8, 9) on the exit end. The potential drop of the apertured diaphragm system (5) at the entrance end accelerates the analyte ions and the donor ions on injection. In this favorable embodiment, the two ion species are injected together. The injected ions fly several (for example, ten) times back and forth through the reaction cell until their kinetic energy is used up by collisions with the damping gas. In the interior of the reaction cell (6) there is preferably ultra-pure nitrogen at a pressure of around 0.05 Pascal, whereby the ions collect after about 5 milliseconds in a cooled state in the axis of the pole rod system of the reaction cell (6) from where they can be extracted (or exported). The pressure of the ultra-pure nitrogen is formed by the equilibrium of a flow from the generator (18) into the ion source chamber, which maintains a pressure there of around 100 Pascal, the flow through the apertured diaphragm system (5) and the power of the pump (16).

If the analyte ions and the donor ions are injected with an acceleration of around 30 to 50 volts, a surprisingly high proportion of multiply charged analyte ions are formed. The majority of the analyte ions which can be extracted from the reaction cell are doubly charged but, depending on the type of the analyte substances, there are also analyte ions with three or four-fold protonation. During this process of generating multiply charged analyte ions, a surprisingly small number of the analyte ions in the reaction cell are fragmented. The donor ions are almost completely used up with this method.

In corresponding experiments, donor ions from the substance group of the phosphazenes have proved successful. These were generated in the simple and usual way by electrospray ionization. It is likely, however, that other substances, for example partially fluorinated hydrocarbons with molecular weights in the range between 100 and 400 atomic mass units, can also be used as donor ions. Such substances, which have a high vapor pressure, can easily be generated at a high rate in an ion source (20) for chemical ionization (CI ion source).

If sodium or potassium adducts can also form as a result of impurities or other matter brought in by the injected ions, then there is not only a protonation of the analyte ions but also a charging with sodium or potassium ions. It is predominantly the analyte ions with a three- or four-fold charge which demonstrate charging of this type with sodium or potassium ions. Depending on the analytical objective, this effect can be exploited or avoided by having clean systems and pure original substances. The doubly charged analyte ions are, surprisingly, only relatively little affected by this charging with alkali ions.

The apertured diaphragm system (7, 8, 9) at the exit end of the reaction cell (6) can be designed so that those ions which have collected in the axis on cooling are continuously extracted through a very fine aperture very close to the axis. This extraction field can be designed to be so fine that it admits only very few of the freshly injected, still uncooled ions, because these ions are generally located outside the axis, also with radial oscillation, and are therefore predominantly reflected at the apertured diaphragms (5) and (7). Injecting the accelerated ions at a slight angle assists this reflection. This combination of continuous injection of singly protonated analyte ions with continuous extraction at the end of the reaction cell (6) results in a continuous ion beam of analyte ions with a high proportion of doubly and multiply charged ions, as is required for the types of tandem mass spectrometer in use nowadays. A pulsed sampling to generate a pulsed ion beam is also possible.

Modern tandem mass spectrometers use almost exclusively quadrupole mass filters (in contrast to FIG. 1) in order to filter out the desired ion species from the continuous ion beam, while destroying all other ion species, and to supply them to the fragmentation device. (An exception is the ion trap mass spectrometer which enables a tandem method in time, but also destroys all ion species not desired for the fragmentation at the stage where parent ions are selected).

The ions can also be stored temporarily in the reaction cell (6), however. It is then possible to use a special device, a mass selective ion gate, to only export the ion species desired, the ions not selected for export being left in the reaction cell and only being fed to the tandem mass spectrometer for analysis at a later time.

A particularly favorable type of such a mass selective ion gate is based on the quadrupole field between the four pole rods of the reaction cell (6) and exports the selected species of the analyte ions axially through the apertured diaphragm system (7, 8, 9) into a second storage reservoir (10), which favorably again takes the form of a quadrupole pole rod system. This ion gate utilizes the fringe field of the RF quadrupole field in front of the apertured diaphragm system at the exit end. At the location of this fringe field, there are axial components of the pseudopotential gradient (the electric pseudo-field) outside the axis. If the analyte ions selected are resonantly excited radially at this location, for example by a slit apertured diaphragm (7) with an alternating voltage being supplied for the excitation, then, as their radial oscillations increase, they increasingly experience the force of the axial component of the pseudo-field which is directed axially outwards. This force imparts to them an axial acceleration which helps them to overcome the DC barrier of the apertured diaphragm system (7, 8, 9) at the exit end and to enter the second, adjacent storage reservoir (10).

There are various types of embodiment for such an ion gate, but they will not be the subject of discussion here. With such an ion gate it is quite possible to achieve very good mass resolving power for the mass selective ion export. It is possible to achieve a mass resolving power of the selection of $R>5000$, which is sufficient for separating ions of one nominal mass from ions of the next nominal mass. This is much better than the mass filters usually used can offer. It is also possible to set lower mass resolutions.

In tandem mass spectrometry, usually a high mass resolution for the selection is not applied since in most cases all ions of an isotope group should be fragmented. Only then is it possible to obtain a true isotope distribution in the fragment ion spectrum as well. However, a high mass resolution like this can, for example, be very useful when, by selecting the monoisotopic ions of an ion species, only monoisotopic fragment ions are to be generated and measured. It is precisely for complex mixtures that this can be very helpful for the unambiguous identification of a substance. If, on the other hand, a true isotope distribution is also to be preserved in the fragment ion spectrum, then either lower mass resolutions can be set, or the various ions of the isotope group can be exported one after the other with high mass resolution and mixed again in the second storage reservoir (10).

There are a number of favorable embodiments for tandem mass spectrometers which can use the reaction method according to the invention in the reaction cell (6) to generate multiply charged ions. For example, the ion sources for the generation of the analyte ions and the donor ions can both be located either inside or outside the vacuum system of the mass spectrometer. Selected multiply charged analyte ions can be filtered out of the continuous ion beam as in usual tandem mass spectrometers by quadrupole mass filters and then fed to the usual fragmentation devices. Different types of mass analyzer can be used. Instead of using the usual fragmentation devices, the multiply charged analyte ions can also be further analyzed in ion trap mass spectrometers. With knowledge of the invention, the specialist can assemble the combination which is most favorable for his analytical task.

Here, however, a detailed description will be given of a first particularly favorable method operating a tandem mass spectrometer which uses the reaction cell according to the invention, which uses a MALDI ion source in the vacuum system of the mass spectrometer, which uses a CI ion source to generate the donor ions and which uses a mass selective ion gate to select the selected species of analyte ions while saving all remaining analyte ions for subsequent analyses. Such a particularly favorable embodiment is shown in FIG. 1.

In this embodiment, a movable support plate (1) for the samples with matrix and analyte substances is located in a housing chamber which is filled with ultra-pure nitrogen at a pressure of around 100 Pascal from a nitrogen generator (18). The sample to be analyzed is bombarded with a focused UV laser beam (2) with a wavelength of 320 to 360 nanometers from a pulsed laser (19). Pulse frequencies up to ten kilohertz are possible with a suitable laser. This vaporizes matrix and analyte substances in a small cloud in each pulse, a small fraction of the analyte substances being singly protonated. The yield can be favorably influenced by shaping the beam of light (2) from the laser.

The cloud spreads out explosively after every pulse, but is cooled very quickly by the ultra-pure nitrogen. (It is possible to increase the yield of analyte ions, which is normally only around $10^{-4}$, by adding donor ions, but this is not the subject of this invention). The MALDI ions from the cloud are now collected by an ion funnel (4) and guided through it to the apertured diaphragm system (5) at the entrance end of the reaction cell. In this apertured diaphragm system (5), and as a result of the difference in the potentials in the axis of the ion funnel (4) and the axis of the reaction cell (6), the analyte ions are accelerated with the desired energy into the reaction cell (6). The exit end of the reaction cell (6) is equipped with an ion gate. During this time, the ion gate is completely sealed with a high potential across the apertured diaphragm (7) so that no ions can get lost. If the difference in the pressures between ion funnel (4) and reaction cell (6) is too high to be maintained easily, then an additional ion funnel or a multipole rod system with corresponding differential pumping system can be interposed.

In this favorable embodiment, a CI ion source (20), which is accommodated in the same housing chamber as the MALDI sample support plate (1), generates the donor ions for the subsequent charging of the analyte ions with protons. The CI ion source (20), which operates particularly well in the pressure range of these housing chambers of around 100 Pascal, uses slight potential gradients to also send its ions into the ion funnel (4). The donor ions are thus accelerated together with the analyte ions into the reaction cell (6). The two in-vacuum ion sources mean that the mass spectrometer can be operated with a relatively small pump system (15, 16, 17), which is not the case when out-of-vacuum ion sources are used.

MALDI samples do not usually contain only one analyte substance but several. Therefore, in the reaction cell, multiply protonated analyte ions are now formed from all the analyte substances, although possibly not with the same yield.

A species of analyte ion which is to be analyzed first is now selected after completion of the reactions inside the reaction cell (6). The ion species selected can be a doubly protonated species of one of the analyte substances or can have a higher degree of protonation. This species of analyte ion is now exported through the mass selective ion gate out of the reaction cell (6) without destroying other ions in the reaction cell (6). The exported analyte ions are then fragmented in one of the usual ways and the fragment ions are analyzed in the mass analyzer of the tandem mass spectrometer by acquiring the fragment ion spectrum.

The analysis by fragment ion spectra can then be repeated for other ion species of the first analyte substance and for any number of ion species of the other analyte substances without having to constantly generate new ions from new sample material, as is the case with the tandem mass spectrometers which are usual today. Other ion species of the same analyte substance can be ions with another charge state, for example triply instead of doubly charged ions, or other ions of an isotope group. This achieves an extraordinarily good utilization of the sample material.

If the design of the vacuum system is appropriate, it is quite possible for the ions in the reaction cell (6) to remain practically unchanged for periods of several minutes; but depending on the cleanness of the vacuum system and the purity of the damping and collision gas which is fed in, it is not possible to completely prevent interfering changes to the ions, mainly in the form of partial discharges of the ions with higher charges, which have been obtained only with difficulty over longer periods of time. Since the tandem mass spectrometer may be intended to be used for the analysis of larger numbers of ion species from the same MALDI sample, for example for the analysis of 20 to 30 ion species, it is certainly favorable, possibly even necessary, to use a fast mass analyzer to acquire the fragment ion spectra. A mass analyzer here is to be considered as "fast" if it can acquire approx. one complete fragment ion spectrum per second. Since the export through the ion gate and the fragmentation takes a lot less than one second, it is possible to analyze many analyte substances in less than a minute.

It is particularly favorable for the analytical purpose of the tandem mass spectrometer if the mass analyzer has a high mass resolving power, for example $R=m/\Delta m>10{,}000$, and provides a high mass accuracy, for example better than three millionths of the mass (3 ppm). Moreover, it is favorable if it has a high mass range for acquiring fragment spectra; for example, fragment ion spectra of digest peptides over a range of around 50 to 4000 atomic mass units. Such a favorable mass analyzer is a time-of-flight mass analyzer with orthogonal ion injection, as shown in FIG. 1.

Before acquiring the mass spectrum of the fragment ions, the exported analyte ions have to be fragmented. As already explained at the beginning, the type of fragmentation is fundamental to the type and scope of the information which can be obtained from the fragment ion spectra. The generation of multiply charged analyte ions in this tandem mass spectrometer according to the invention means that all the known types of fragmentation of modern tandem mass spectrometers can be used. Modern tandem mass spectrometers (apart from TOF/TOF instruments) all operate with electrospray ion sources, which by their nature favorably supply multiply charged analyte ions. The tandem mass spectrometer according to the invention compensates the deficit which occurs when using ion sources that supply practically only singly protonated ions.

For collisionally induced fragmentation (CID), the mass selected analyte ions are to be injected with a collision energy of 30 to 100 electron-volts into a fragmentation chamber (10), which again can be designed as a quadrupole rod system. The fragmentation chamber (10) is filled with a damping gas, which here acts as the collision gas for the fragmentation. It is perfectly possible to use ultra-pure nitrogen at the same pressure as in the reaction cell (6), so that the pressure is uniform from the reaction cell (6) to the collision fragmentation chamber (10). The pressure can be maintained by a gas generator (18), a pressure-reducing feed to the ion source chamber, and also by the interplay of apertured diaphragms and pump power.

The collisionally induced fragmentation can, however, also be undertaken in the fragmentation chamber (10) by means of radial dipolar excitation of the parent ions. This excitation requires times of a few tens of milliseconds to around a hundred milliseconds for a fragmentation, since many collisions are necessary before sufficient energy for a decomposition is absorbed. This type of collisionally induced fragmentation is, however, particularly favorable because, in the main, only direct daughter ions are generated, and no granddaughter ions because, after the decomposition of the parent ions, the daughter ions are no longer in resonance with the exciting dipole field and are immediately damped and cooled by the collision gas. Another type of fragmentation with similar fragmentation results can be undertaken by irradiating the ions with an infrared laser (IRMPD) (not shown in FIG. 1).

As already mentioned several times above, quite different fragmentation products with orthogonal information content can be obtained by a fragmentation initiated by electron transfer. This electron transfer can be carried out by the direct capture of low energy electrons (ECD), by bombardment with highly excited neutral particles (MAID=metastable atom induced decomposition) from a FAB particle source (FAB=fast atom bombardment) or by electron transfer by negative ions of low electron affinity (ETD).

Of particular interest here is bombardment with highly excited neutral particles, for example helium, from a FAB particle source (21), as available commercially. These highly excited particles can easily be injected into storage cells for ions operated by RF voltages, since the neutral particles are not influenced by the RF fields. For example, these particles can easily be injected into a quadrupole RF rod system (10), which in FIG. 1 serves as the fragmentation chamber. A substantial fragmentation can therefore be conducted in around 200 milliseconds.

For the fragmentation, the embodiment of the tandem mass spectrometer described as being particularly favorable thus contains a collision cell (10) constructed as a quadrupole RF rod system, and it also has a FAB particle source (21) which can inject highly excited helium atoms into this collision cell (10). Collision fragment ions and fragment ions from electron transfer can then be generated sequentially from the same species of analyte ion, something which is particularly favorable for the determination of bio-analytical sequences.

For this embodiment it is favorable to again use a quadrupole rod system charged with a damping gas as the fragmentation chamber (10). The fragment ions are immediately damped and collect in the longitudinal axis of this chamber (10). They can be introduced into the mass analyzer as a fine ion beam through narrow terminal apertured diaphragms (11), which also act as the pressure-reducing stage toward the time-of-flight mass analyzer.

The best mass analyzer for this particularly favorable embodiment is a time-of-flight mass spectrometer with orthogonal ion injection. The ions are injected in the form of a very fine beam and preferably monoenergetically into the pulser (12) of the time-of-flight mass spectrometer. The pulser then periodically pulse ejects a section of the ion beam into the drift region of the time-of-flight mass spectrometer at right angles to the previous direction of flight, with a frequency of some 5 to 20 kilohertz. The ions separate according to their charge-related mass because the speeds of the various ion species are different. The ions then enter an ion reflector (13), which reflects them onto an ion detector (14). This brings about a spatial and energy focusing, which results in a high mass resolving power. In the ion detector, the ion currents of the individual ion species are amplified and then fed via an electrical post-amplifier to a transient recorder, which digitizes sections of the ion currents every half a nanosecond and synchronously adds the measurement values to the corresponding measurement values of the previously acquired spectra. Individual spectra of approx. 50 to 100 microseconds in length are thus measured. This produces sum spectra which, in commercial instruments, comprise around 128,000 or even 256,000 ion current values, for example.

In commercially available desktop instruments, these time-of-flight mass spectra exhibit mass resolutions of $m/\Delta m=15,000$ and mass accuracies of around 3 ppm (parts per million). The pulser operates at around 15 kilohertz if accelerations in the pulser of around 8 to 10 kilovolts are used. Fifteen thousand mass spectra are therefore generated and added per second. In the pulser, a very large number of ions of the fine ion beam are collected and periodically pulse ejected; good time-of-flight mass spectrometers have utilization rates for the ions of the ion beam in the order of some 50 percent of the ions injected. If the additions are terminated after 1500 spectra, then ten sum spectra per second can be supplied. These instruments can therefore also be used for tracking rapidly changing processes; they use a large proportion of the ions of the ion beam provided and they have an adjustable dynamic range of measurement thanks to the number of the mass spectra added being adjustable. With larger, or differently designed, instruments, it is possible to achieve significantly better specifications, for example a resolution of $R>50,000$ and mass accuracies of a millionth and better.

If even higher mass accuracies are required, the time-of-flight mass spectrometer can be replaced by an ion cyclotron resonance mass spectrometer. This usually operates with a magnetic field generated by superconducting magnetic coils. Instruments with seven, nine, eleven and fifteen Tesla are available; stronger magnetic fields are under development. The mass accuracies can be considerably better than one millionth of the mass. These FTMS mass spectrometers operate relatively slowly, however; they only just meet the definition of a “fast” mass spectrometer.

Since a mixture of analyte ions can, however, also generate protonation reactions among themselves when injected into the reaction cell, something which is not always desirable, a second particularly favorable embodiment of the tandem mass spectrometer is described here. In this embodiment, the singly charged analyte ions from the MALDI sample are first stored gently (with no acceleration on injection) in a quadrupole rod system without subjecting them to a protonating reaction. As the first storage cell, this pole rod system has a mass selective ion gate at the end out of which analyte ions selected according to their mass can be exported into the adjacent reaction cell. This export can be immediately combined with an acceleration, or it can be first guided through an ion guide, in which the donor ions can also be added. Ion switches for this addition of the donor ions have been described.

The donor ions can also be continuously fed in through the ion funnel, which also collects the MALDI ions, into the first storage cell, in which the MALDI ions are stored. If one species of MALDI analyte ion is sampled through the ion gate for an analysis of the fragment ions, it is also possible to sample the donor ions at the same time or intermittently. The simultaneous sampling of the donor ions can be achieved by mixing the excitation frequencies in front of the ion gate. Because only one species of donor ions is then to be exported, the frequency mixture is not complex. The donor ions are then injected together with the selected species of analyte ions into the reaction cell. Doubly and multiply charged analyte ions are generated there. These are exported, subsequently fragmented and then analyzed as a fragment ion spectrum. For the export of the next species of analyte ions from the first storage cell for the purpose of analysis, sufficient donor ions have now collected in the meantime to be able to be exported together with the analyte ions. This process can be repeated for all species of analyte ions. A tandem mass spectrometer such as this is particularly favorable because it avoids different types of analyte ions mutually protonating each other in the reaction cell, which can occur because some types of analyte ions are able to act as proton donors for other types of analyte ions. The analyte ions which act as donor ions would thus be lost to subsequent analyses.

The tandem mass spectrometer can also be equipped with a further device for generating granddaughter ions. This principally requires that the first fragmentation device is followed by another ion gate which is used to select a specific species of daughter ion. The daughter ions selected are then fragmented into granddaughter ions in a second fragmentation device. The mass analyzer then scans the granddaughter ion spectrum. The second fragmentation stage considerably increases the selectivity of the method and hence the identification certainty. The daughter ions that are not selected remain in the first fragmentation device and can also be analyzed by further fragmentation in subsequent steps after being selected.

To present an example of the use of the tandem mass spectrometer with a reaction cell according to the invention and an ion gate, a method is given here with which the proteins which are located in a 2D gel, largely separated into so-called "spots", can be identified. The method described here has an extraordinarily high sensitivity since practically no ions are lost after being generated.

The stained spots of the 2D gels are punched out, subjected to an enzymatic digest of the protein, and the digest peptides are then eluted out of the gel. A few microliters of the eluent are applied in the usual way, together with matrix substance, onto a sample spot of a MALDI sample support plate. In the normal way, 384 or even 1536 samples can be accommodated on a sample support plate. The sample support is introduced through a lock into the ion source of the tandem mass spectrometer. Up to this point, this method is the same as is used in conventional MALDI TOF or MALDI TOF/TOF instruments.

Bombardment with pulsed laser light (2) from a UV laser (19) now generates singly protonated analyte ions from the digest peptides. These ions are accelerated together with donor ions from a CI ion source (20) into the reaction cell (6), where they react to produce multiply protonated analyte ions. These multiply protonated analyte ions are stored in the reaction cell (6). A small representative fraction of the ions from the reaction cell is now fed to the time-of-flight mass spectrometer (12, 13, 14), without being selected or fragmented, to obtain an overview of the masses of the digest peptide ions present. The multiply charged analyte ions of the digest peptides are then exported individually through the ion gate and fragmented. The fragment ion spectra serve in the usual way to identify the protein in the spot by feeding the spectra to the known search engines for comparisons with protein sequence databases. If these search engines do not provide satisfactory results because, for example, it is a previously unknown protein, then a comparison of collision fragment ions and fragment ions from electron transfer makes it possible to determine large parts of the amino acid sequence. An automatic method, including sample ionization and spectrum acquisition, requires only a very short time to identify the protein of a 2D gel spot in this way; for methods which are well set up, less than a minute.

This particularly favorable embodiment of the tandem mass spectrometer with reaction cell for the generation of multiply charged analyte ions, with ion gate and with a fragmentation device for two types of fragmentation is far superior to current MALDI TOF/TOF instruments since it provides a higher sensitivity, a higher mass accuracy and a higher information content.

The novel tandem mass spectrometer with reaction cell for the generation of multiply charged analyte ions can also be favorably used for coupling the MALDI ionization with a separation of highly complex analyte mixtures by liquid chromatography (HPLC MALDI). The ions of the digest peptides of a very complex mixture generally occupy all masses of the mass range multiply even after a moderately good separation. It is known that the masses of singly charged digest peptide ions form clusters around 0.3 atomic mass units wide at each mass number. Doubly charged ions form clusters 0.15 mass units wide around half integer mass values. Therefore, if one selects the monoisotopic ions of a digest peptide with unity resolution (one whole integer mass number is separated from the next), then a superimposition of many ions with the same integer mass number but different identities must be expected. To increase the selectivity, fragment ion spectra have to be acquired, since these are largely unique for each digest peptide, similar to a fingerprint. Since with the simultaneous fragmentation of several digest peptides the fragment ion spectra are superimposed on each other, the known fragment ion spectrum of the analytically interesting digest peptide has to be filtered out with known mathematical methods.

The term "monoisotopic" ions of the digest peptide means those ions of the isotope group which consist of only $^{12}C$, $^{1}H$, $^{14}N$, $^{16}O$, $^{32}S$ and $^{31}P$. If they are selected with good separation from the other ions of the isotope group, and then fragmented, the fragment ion spectrum of these monoisotopic ions consists only of single lines and no longer of isotope groups. This effect can be put to good use in the filter process since most of the superimposed ion species are not monoisotopic ions and appear after the fragmentation as (usually strangely distorted) isotope groups.

For organic substances, the monoisotopic ion signal is the strongest signal up to a molecular weight of m=2200 atomic mass units; the choice of the monoisotopic ions is therefore particularly favorable here. In the adjacent region of molecular weights from m=2200 up to m=3300 atomic mass units the ion signal of the ions which contain a $^{13}C$ is the strongest signal. If these ions are exported and fragmented, a fragment ion spectrum made up of two ion signals per isotope group in each case with easily predictable intensity ratios is obtained. This fragment ion spectrum can also therefore by easily identified and used for an analysis. Similarly, this also applies for ions which contain two or more $^{13}C$ atoms, but the interpretation of the fragment ion spectra becomes more and more complicated. It is by no means always necessary, however, to strive for a true isotopic distribution in the fragment ion spectrum by exporting and fragmenting all isotope signals of an isotope group.

Protein mixtures can also be measured without enzymatic digest, of course. In this case, the time-of-flight mass analyzer must be set to a high mass range of a few 100,000 atomic mass units.

The instrument and method can be used in a wide variety of applications. The method with its many modifications can be used, for example, in cell biology research, in medical diagnostics with biomarker proteins, in clinical studies for pharmacokinetics and in many other analyses, conducted both for research and routinely, to determine the concentrations of substances in complex mixtures.

What is claimed is:

1. A method for the generation of multiply protonated analyte ions from singly protonated analyte ions, comprising injecting under acceleration both the singly protonated analyte ions and donor ions into a reaction region where the singly protonated analyte ions and the donor ions react to form the multiply protonated analyte ions.

2. The method according to claim 1, further comprising generating the donor ions from one of a substance with low proton affinity and a mixture of substances, each of which has low proton affinity.

3. The method according to claim 2, wherein the donor ions are ions of at least one substance selected from the phosphazene group.

4. The method according to claim 1, wherein the reaction region comprises a closed reaction cell.

5. The method according to claim 4, wherein the analyte ions and the donor ions are injected into the closed reaction cell through acceleration regions with potential gradients of at least ten volts.

6. The method according to claim 5, wherein the analyte ions and the donor ions are injected into the closed reaction cell through acceleration regions with potential gradients of 30 to 50 volts.

7. The method according to claim 5, wherein the analyte ions and donor ions are injected together through the same acceleration region into the closed reaction cell.

8. The method according to claim 4, wherein the closed reaction cell comprises an RF multipole rod system having terminal apertured diaphragm systems, and means for applying voltage potentials across the apertured diaphragm systems in order to reflect the majority of ions into the closed reaction cell.

9. The method according to claim 4, wherein the closed reaction cell is filled with damping gas at a pressure of between $10^{-2}$ and 10 Pascal.

10. A tandem mass spectrometer for analyzing analyte ions comprising:

a) an ion source to generate the analyte ions, b) an ion source to generate donor ions, c) a reaction cell to protonate the analyte ions, d) at least one acceleration region to accelerate the analyte ions and the donor ions into the reaction cell, e) a device to select a multiply protonated ion species generated in the reaction cell, f) a device to fragment the selected ion species into fragment ions, and g) a mass analyzer to measure the mass spectrum of the fragment ions.

11. The tandem mass spectrometer according to claim 10, wherein the ion source for generating the analyte ions comprises a source that generates the analyte ions by laser desorption of a sample which contains analyte substances and is held in a sample support.

12. The tandem mass spectrometer according to claim 11, wherein the ion source for generating the analyte ions comprises an ion source that generates the analyte ions by matrix-assisted laser desorption and ionization.

13. The tandem mass spectrometer according to claim 10, wherein the ion source for generating the donor ions comprises one of an electrospray ion source and an ion source for chemical ionization.

14. The tandem mass spectrometer according to claim 10, wherein the reaction cell comprises an RF multipole rod system with terminal apertured diaphragm systems.

15. The tandem mass spectrometer according to claim 10, wherein the device for selecting a multiply protonated ion species comprises an ion gate that exports a multiply protonated ion species out of the reaction cell and leaves ions not selected undamaged in a region in front of the ion gate.

16. The tandem mass spectrometer according to claim 15, wherein the reaction cell comprises a quadrupole pole rod system and the ion gate is positioned at one end of the quadrupole rod system so that the ion gate exports radially excited ions of the selected ion species in an axial direction out of the reaction cell.

17. The tandem mass spectrometer according to claim 10, wherein the device for selecting a multiply protonated ion species comprises a quadrupole filter that allows only the selected ions to pass.

18. The tandem mass spectrometer according to claim 10, wherein the device for fragmenting the analyte ions comprises a mechanism that can fragment ions both by collisionally induced fragmentations and fragmentations by electron transfer.

19. The tandem mass spectrometer according to claim 10, wherein the mass analyzer comprises a time-of-flight mass analyzer with orthogonal ion injection.

20. A tandem mass spectrometer comprising:

a) an ion source to generate a mixture of analyte ions, b) an ion source to generate donor ions, c) a storage cell to store the mixture of analyte ions and the donor ions, d) an ion gate located on the storage cell and which can export one species each of analyte ions and donor ions, e) a reaction cell to protonate the analyte ions, f) an acceleration region to accelerate the analyte ions and the donor ions into the reaction cell, g) an ion gate on the reaction cell to export a multiply protonated species of analyte ions, h) a device to fragment the multiply protonated species of analyte ions into fragment ions, and i) a mass analyzer to measure the mass spectrum of the fragment ions.

* * * * *